United States Patent [19]

Middlebrook et al.

[11] Patent Number: 5,401,902
[45] Date of Patent: Mar. 28, 1995

[54] REENTRABLE MOISTURE BARRIER

[76] Inventors: John S. Middlebrook, 2771 Long Meadow Dr., West Palm Beach, Fla. 33414; James P. Ryan, 3718 Queen Anne Rd., Woodstock, Ill. 60098

[21] Appl. No.: 8,933

[22] Filed: Jan. 26, 1993

[51] Int. Cl.⁶ .............................................. H02G 9/02
[52] U.S. Cl. ........................................ 174/38; 174/37
[58] Field of Search ............................ 174/37, 38, 60

[56] References Cited

U.S. PATENT DOCUMENTS

| | | | |
|---|---|---|---|
| 3,523,156 | 8/1970 | Phillips | 174/38 |
| 3,538,236 | 11/1970 | Baumgartner | 174/38 |
| 3,557,299 | 1/1971 | Dienes | 174/38 |
| 3,714,369 | 1/1973 | Bunten | 174/38 |
| 3,725,581 | 4/1973 | Gillemot | 174/38 |
| 3,740,452 | 6/1973 | Bunten | 174/38 |
| 3,848,074 | 11/1974 | Channell | 174/38 |
| 4,097,683 | 6/1978 | Summers | 174/38 |
| 4,219,942 | 9/1980 | Hair | 34/93 |
| 4,488,013 | 12/1984 | Ziegler | 174/38 X |
| 4,631,353 | 12/1986 | Marks | 174/38 X |
| 4,701,574 | 10/1987 | Shimirak | 174/93 |
| 4,724,278 | 2/1988 | Smith | 174/38 |
| 4,737,600 | 4/1990 | Mathis | 174/87 |
| 4,902,855 | 2/1990 | Smith | 174/77 R |
| 4,924,034 | 5/1990 | Truesdale | 174/87 |
| 4,982,054 | 1/1991 | DeBruycker | 174/87 |
| 5,055,636 | 10/1991 | Jaycox | 174/38 X |

Primary Examiner—Leo P. Picard
Assistant Examiner—Hyung S. Sough
Attorney, Agent, or Firm—Keck, Mahin & Cate

[57] ABSTRACT

A reentrable moisture barrier for use in enclosures for cables and or cable components to prevent entry of ground moisture is disclosed. The barrier is inexpensive and easy to install. One example of the invention is in conjunction with an enclosure or housing with a first cover portion removable from a second base portion. The improved reentrable moisture barrier is formed of an inexpensive flexible sheet which may be deformed and replaceably inserted in the enclosure to prevent ground moisture from migrating from the open bottom of the housing to the top of the first cover portion where it may condense and be deposited on the cables and cable components. The reentrable barrier is wrapped around and stuffed between the cables and the interior of the second base portion and the first cover portion is replaced. Ground moisture is thus prevented from reaching the interior of the first cover portion.

20 Claims, 1 Drawing Sheet

REENTRABLE MOISTURE BARRIER

FIELD OF THE INVENTION

This invention relates to barriers for preventing moisture from contacting cables and or cable components located in above ground enclosures. More specifically a reentrable moisture barrier having at least one flexible deformable sheet is stuffed between and around cables and or cable components and the inside of an enclosure to prevent ground moisture from reaching and then condensing in the enclosure.

BACKGROUND OF THE INVENTION

The telephone, power, cable television, and other industries have long made use of enclosures or housings for protecting above ground connections between underground wires and cables and components attached to these cables and wires. These connections between cables and wires and the components often involve a valuable investment and must be protected from the outside environment by the protective enclosure or housing.

A cable is defined broadly and includes conventional metal cables used in telecommunications and power applications as well as fiber optics cables, cable television cables and the like. Cable components may encompass conventional telephone cable connectors or other items such as terminal blocks for power and telephone lines, fiber optics connectors, amplifiers, power supplies, distribution devices and many other cable related devices.

The outside environment contains both natural and human threats to the above ground connections to cables. Examples of human threats include malicious vandalism or premeditated entry. Natural threats are further broken down between above ground and below ground environmental threats. Above ground threats may include acid rain, wind driven rain, snow, dirt, insects and ultraviolet rays for example. Below ground threats may include rodents, insects, and ground moisture. All three of these outside environmental threats, human, above ground, and below ground, pose specific problems for the protection of the cables and cable components contained within the protective enclosures.

The protective enclosures are designed to minimize or eliminate the exposure of the cables and or cable components to these outside threats. The protective enclosures are thus fabricated from materials that are durable and long lasting. Such materials may be metallic such as steel or non-metallic such as fiberglass or plastic. Enclosures have a wide variety of configurations and sizes which reflect among other factors the many different cable diameters and the number of cables or wires to be brought into the enclosure. An enclosure may be made of one part or require the assembly of many parts. When assembled, all enclosures have one end that is located in contact with the ground at or near ground level or below ground level. Underground cables are brought up through this end to the interior of the enclosure.

All protective enclosures are designed to deal with the environmental threats through features in their engineering. The enclosures also must be designed so as to be easily and quickly disassembled and reassembled for access should additional work have to be performed on the cables and or cable components contained therein. Presently, current enclosures have successfully excluded most threats from harming the cables and cable components contained within the enclosure while allowing easy access to the interior of the enclosure if desired. For example, an enclosure built of heavy duty material is usually sufficient to prevent vandalism. It is also sufficient to prevent snow, dirt, rain, insects and rodents from accessing its interior to harm the cables and or cable components inside. One notable threat which is not presently protected for while allowing easy access to the cables and cable components within the enclosure is that of ground moisture.

Ground moisture is prevalent in all climates and areas including the driest regions. After a protective enclosure is assembled and put in contact with the ground, ground moisture will migrate through the openings used to transmit the cables to the interior of the enclosure. This ground moisture will periodically condense inside the top end of the enclosures. The amount of time for condensation and the amount of condensation will vary based on several factors. These factors include the type of material used to construct the enclosure, the outside temperature, and the time of day.

When enough moisture has condensed on the inside of the top end of the enclosure, it will drip onto the cables and or cable components, causing corrosion, degradation and or failure of performance. This phenomenon poses a major threat to the cables and or cable components i.e. the investment.

Thus, a moisture barrier is required to prevent ground moisture from migrating through the cable accesses of the protective enclosures. A non-porous, non-hydroscopic barrier is preferred to block moisture from moving up into the interior of the enclosure. The barrier must be inexpensive, and be easily and quickly installed in the wide variety of enclosure configurations. The barrier must also be easily and quickly removed and reinstalled when additional cables and or cable components are added.

Previous attempts to reduce or eliminate the ground moisture problem have included placing water proof sealing chambers made of materials such as foam around the cables and or cable components. The sealing chamber is usually cemented or glued onto the components or molded to snugly fit the cables. Another solution has been to pour expanding foam within the confines of the base, allowing the foam to form a barrier. Unfortunately, such sealing materials are difficult or impossible to remove once they have been installed. Such materials are also very costly. In addition, such materials are installed permanently and may not be readily replaced when repairs need to be made or when additional cables or components need to be connected in the enclosure.

SUMMARY OF THE INVENTION

It is an object of the present invention is to provide an inexpensive reentrable moisture barrier for use in an enclosure for protecting cables and cable components.

Another object of the present invention is to provide an easily installable reentrable moisture barrier for use in an enclosure for protecting cables and cable components.

Another object of this invention is to provide an easily replaced and reusable reentrable moisture barrier for use in an enclosure for protecting cables and cable components.

Still another object of the present invention is to provide a reentrable moisture barrier which prevents the entry of ground moisture vapor into the portion of an enclosure for protecting cables and cable components provided for making connections.

Briefly, and in accordance with the foregoing, this invention relates to an improved reentrable moisture barrier for enclosures for cables and or cable components. The enclosure has a first end and a second end in contact with the ground or below ground and allows entry of cables to the enclosure. The barrier is formed of an inexpensive flexible sheet which is disposed between the cables below their connection to prevent ground moisture from reaching the cables and or cable components contained therein.

One embodiment of this invention is related to a reentrable moisture barrier for use in an enclosure for cables and cable components. The enclosure has a removable first portion and a second portion. The removable first portion has an enclosed first end, an open second end, and an inside surface. The second portion has an open first end with a cross sectional area, matable with the open second end of the first portion, a second end, an inside surface. The second portion is partially buried below ground level.

The reentrable moisture barrier is formed from at least one flexible sheet having a greater cross sectional area than the cross sectional area of the enclosure. The flexible sheet is disposed between the cables and the inside surface of the enclosure, and to completely fill the space so as to form a barrier to prevent ground moisture from passing upward through the barrier into the portion of the enclosure provided to make cable connections and to house cable components.

BRIEF DESCRIPTION OF THE DRAWINGS

The invention may be better understood from the following detailed description when read with reference to the drawings in which.

DETAILED DESCRIPTION OF THE PREFERRED EMBODIMENT

The present invention involves a reentrable moisture barrier for protective enclosures for cables and or cable components. These enclosures have an enclosed first end and a second end in contact with the ground or below the ground through which cables enter the enclosure. The barrier is formed of an inexpensive flexible sheet which is disposed between the cables below their connection to prevent ground moisture from reaching the cables and cable components.

Figure 2:
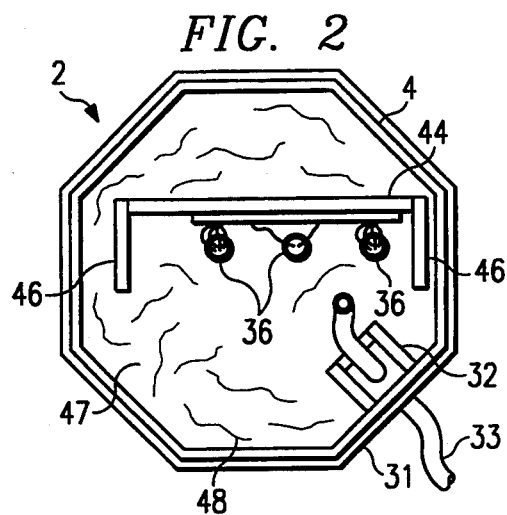
FIG. 2 shows a top view of the base of the pedestal shown in FIG. 1, with the reentrable moisture barrier of the present invention installed.
Figure 1:
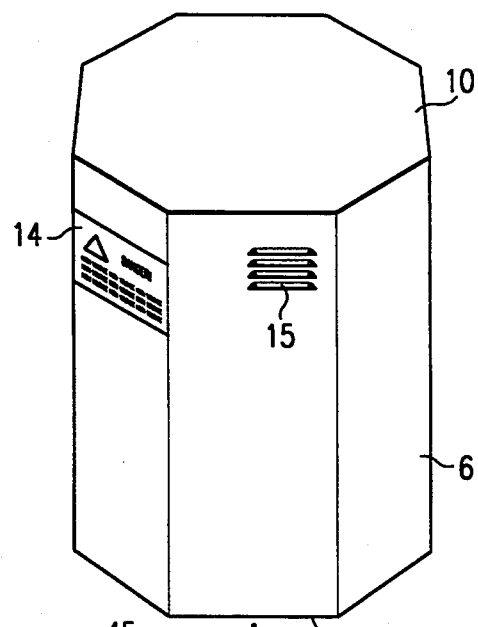
FIG. 1 shows an exploded perspective view of a pedestal type enclosure provided with a reentrable moisture barrier in accordance with the present invention.
Figure 1:
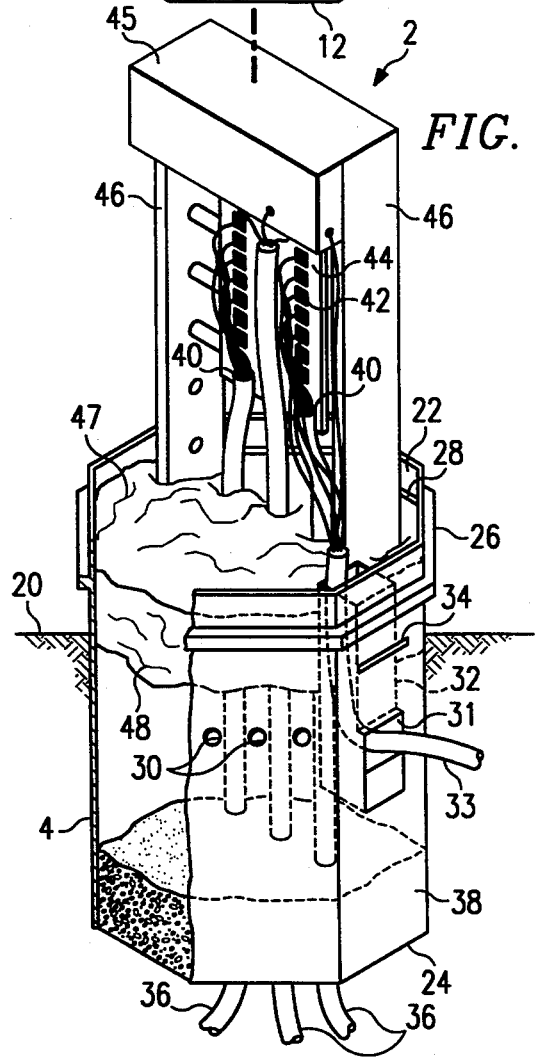

One example of the present invention in use with one type of protective enclosure is shown in FIGS. 1 and 2. Turning to FIG. 1, a pedestal enclosure 2 is formed from a bottom or base portion 4 and a top or cover portion 6. The pedestal enclosure 2, as shown, is constructed of a heavy duty plastic. However, similar enclosures may be formed of any durable material such as fiberglass or metal. Additionally, different shapes of enclosures having more or less than two portions may advantageously utilize the present invention as will be explained below.

The cover portion 6 has a closed first or top end 10 and an open bottom or second end 12. A label area 14 may be located on a readily visible portion of the outside surface of the cover portion 6. The label area 14 may contain useful information, warning signs, or the like. Cover portion 6 may also be provided with ventilation slits 15 to provide ventilation to the interior of cover portion 6. However, the slits 15 are not provided if more complete environmental isolation of the interior of the housing is desired.

The cover portion 6 is generally located entirely above ground level 20. The open bottom or second end 12 of the cover portion 6 is matable with and removable from the bottom or base portion 4 which is substantially buried below ground level 20 in this example. Thus, when the cover portion 6 is installed on the base portion 4, the cover portion 6 is completely above ground. Of course other enclosures may be located at or near ground level or below ground level.

The base portion 4 has an open upper or first end 22 and a lower second end 24. The second end 24 in this embodiment is open to allow entry of cables into the base portion 4. The base portion 4 may be formed so that second end 24 is substantially closed allowing only for openings for entry of cables into the base portion 4. The open first end 22 has a slightly smaller cross sectional area than that of the open first end 12 of cover portion 6. Thus, a snug fit is provided when the cover portion 6 is received over and installed over the base portion 4. An outwardly extending rib 26 circumferentially surrounds the outside surface of the base portion 4 just below the open first end 22. The rib 26 provides a stop which prevents cover portion 6 from telescoping over a greater portion of the height of base portion 4 than is desireable. A recess 28 may be formed around the interior circumference of the base portion 4 corresponding to the rib 26.

Drop wire ports 30 are provided in the base portion 4 to permit the entry of aerial wires into the pedestal enclosure 2. A drop channel 32 attached to the interior surface of the base portion 4 may be provided leading to a drop port 31. A cable 33 may pass through the port 31 and be received in channel 32.

A ground level line 34 may be molded into the side of base portion 4 to aid in insuring that the base portion 4 is buried to the proper depth when it is required to be below ground level. The lower or second end 24 provides an entry into the enclosure 2 for underground cables 36. Base portion 4 may be partially filled with a filler material such as pea gravel 38 to help prevent rodents from entering the enclosure 2. Ends 40 of the cables 36 extend above the top open end 22 and into cover portion 6 when the cover portion 6 is installed on the base portion 4. The ends 40 of the cables 36 are separated into individual wires or conductors which for example are used for separate telephone lines. These wires may be connected to each other or attached to terminal blocks 42 which are supported on a backboard 44. A cable component box 45 may also be located within the pedestal enclosure 2. The cable component box 45 may house amplification devices, communication relays, or other communication components for telephone applications. The cable component box 45 may also house any variety of other devices for other communication and non-communication applications, depending on the utilization of pedestal enclosure 2. For example, power amplifiers, cable television and power billing systems, and junction devices may all be components located within the pedestal enclosure 2. Uprights 46 are provided to support the cable component box 45 and the backboard 44. The lower ends of uprights 46 are secured to the interior surface of the base portion 4. Of course, other support arrangements may be utilized to adapt to the shape and nature of different cables and cable components to be located in the enclosure.

A reentrable moisture barrier 47 in accordance with the present invention is formed by a flexible sheet 48 which is disposed by wrapping around, stuffing and crumpling between the cables 36, the uprights 46, and the interior surface of the base portion 4. By installing the sheet 48 in such a manner, moisture which seeps up through the pea gravel 38 in the base portion 4 will be prevented by the reentrable moisture barrier 47 formed by the sheet 48 from reaching the inside of cover portion 6. Thus, cables and or cable components such as the cable component box 45, the backboard 44, and the terminal blocks 42 are protected from ground moisture formed on the inside surfaces of the cover portion 6.

Figure 3:
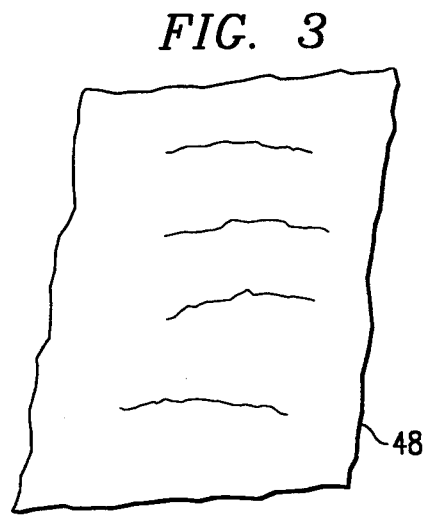
FIG. 3 shows a typical sheet from which the reentrable moisture barrier of the present invention is formed.

The flexible sheet 48 of the reentrable moisture barrier 47 of the present invention is shown in FIG. 3. The sheet 48 has a rectangular shape, being about 36 inches by 60 inches in size. The optimal surface area of the sheet 48 should be greater than the cross sectional area of the first open end 22 of the base portion 4. The sheet 48 may be formed of a plastic such as vinyl, which is very inexpensive and easy to manufacture. However, other materials may be utilized if they are deformable, non-hydroscopic and non-porous. Further, the sheet 48 may have any number of shapes and dimensions. For example, the sheet may be a rigid or pliable membrane which may be fitted between the cables. The reentrable moisture barrier 47 is easily installed or replaced within the pedestal enclosure 2. Installation of the reentrable moisture barrier 47 may be accomplished in a matter of seconds.

While the moisture barrier 47 is not expensive, its installation is quite straightforward. Installation of the reentrable moisture barrier 47 may be accomplished in a matter of seconds. Assuming that the base portion 4 of a pedestal is buried in the ground up to the ground line 34 over the desired connection between the cables 36, the wires emanating from the cable ends 40 are connected, if desired, to the component box 45 or the terminal blocks 42 which are mounted above the first open end 22 of base portion 4. To install the moisture barrier, one corner of the sheet 48, is stuffed into the recess 28. Alternatively, a corner of the sheet 48, may also be stuffed into the open top end of the drop wire channel 32 if desired. Of course, if the enclosure is not provided with a recess 28 or drop wire channel 32, one end of the sheet 48 may simply be crumpled up and stuffed between the cables 36 and the interior of base portion 6.

After stuffing one end of sheet 48 into the recess 28, the drop wire channel 32 or between the cables 36 and the interior of base portion 6, the remainder of sheet 48 is wrapped around the uprights 46 and each of the cables 36. Additional sheets similar to sheet 48 may be then wrapped and stuffed around the cables 36, the uprights 46 and the interior surface of cover portion 6, so as to provide an even more impermeable barrier to ground moisture. After the reentrable moisture barrier 47 is formed, the cover portion 6 is installed on base portion 4 to complete the pedestal installation.

The one or more sheets 48 forming the moisture barrier 47 of the present invention is readily reusable. Often it is desirable to replace components contained within enclosures or to perform routine maintenance on the cables and or cable components contained therein. In such a case the reentrable moisture barrier 47 is reusable. After the cover portion 6 is removed from the base portion 4, the sheet or sheets 48 are removed from around the cables 36, and from within the recess 28, and the drop wire channel 32. Once the sheet 48 is removed, access to the cables 36 and cable components is readily available maintenance or for the addition of more cables or components. After installation or maintenance is complete, the sheet 48 is replaced according to the steps described above to replace the moisture barrier 47, and the cover portion 4 is replaced.

The aforementioned description is not to be interpreted to exclude other types of enclosure installations which might advantageously employing the reentrable moisture barrier of the present invention. For example, the invention may be used with enclosures provided for connection of cables and components in a variety of systems such as fiber optics, cable television, power distribution and the like. It is also recognized that the reentrable moisture barrier of this invention may be used with other types of enclosures such as a telephone cross connect boxes, cable television enclosure boxes, power distribution enclosure boxes and the like. It is to be understood that the above described reentrable moisture barrier is merely an illustrative embodiment of the principles of this invention and that numerous other arrangements and advantages may be devised by those skilled in the art without departing from the spirit and scope of this invention.

What is claimed is:

1. A reentrable moisture barrier in combination with an enclosure for cables and cable components, the enclosure comprising an enclosed first end, a second end, an inside surface, the second end being in contact with a ground surface, the cables entering the enclosure through the second end, and the reentrable moisture barrier comprising at least one flexible sheet being placed in the enclosure and in contact with the inside surface of the enclosure, the flexible sheet further being crumpled so as to be stuffed within the inside surface of the enclosure to prevent ground moisture from condensing on the inside surface of the enclosure.

2. The reentrable moisture barrier of claim 1 wherein the at least one flexible sheet is non-porous and non-hydroscopic.

3. The reentrable moisture barrier of claim 2 wherein the at least one flexible sheet is formed of a plastic material.

4. The reentrable moisture barrier of claim 1 wherein the at least one flexible sheet is removable from and reusable in the enclosure.

5. The reentrable moisture barrier of claim 1 wherein the at least one flexible sheet is a rectangular shape.

6. The reentrable moisture barrier of claim 1 further comprising a second flexible sheet being placed in the enclosure and in contact with the inside surface of the enclosure, the second flexible sheet being crumpled and stuffed within the inside surface of the enclosure to prevent ground moisture from condensing on the inside surface of the enclosure.

7. The reentrable moisture barrier of claim 1 further comprising additional flexible sheets being placed in the enclosure and in contact with the inside surface of the enclosures, a second flexible sheet being crumpled and stuffed within the inside surface of the enclosure to prevent ground moisture from condensing on the inside surface of the enclosure.

8. A reentrable moisture barrier in combination with an enclosure for cables and or cable components, the enclosure having a removable first portion, a second portion, and support means for holding cables and or cable components within the enclosure, the removable first portion having an enclosed first end, an open second end, and an inside surface, the second portion being located at or near or below ground level and having an open first end, a second end, an inside surface, with a first cross sectional area which is matable with the open second end of the first portion, and an inside surface, and the support means being disposed within the first portion and second portion of the enclosure and being attached to the inside surface of the second portion, the reentrable moisture barrier comprising:

at least one flexible sheet having a greater cross sectional area than the first cross sectional area of the open first end of the second portion; and the at least one flexible sheet being crumpled so as to be disposed between the support means and the inside surface of the second portion so as to form a moisture proof barrier between the open second end of the second portion and the first portion to prevent ground moisture from reaching and condensing on the inside surface of the first portion.

9. The reentrable moisture barrier of claim 8 wherein the at least one flexible sheet is non-porous and non-hydroscopic.

10. The reentrable moisture barrier of claim 8 wherein the at least one flexible sheet is formed of a plastic material.

11. The reentrable moisture barrier of claim 8 wherein the at least one flexible sheet is removable from and reusable in the second portion.

12. The reentrable moisture barrier of claim 8 wherein the at least one flexible sheet is a rectangular shape.

13. The reentrable moisture barrier of claim 8 wherein a second flexible sheet is disposed between the cables and the inside surface of the second portion to prevent ground moisture from reaching and condensing on the inside surface of the first portion.

14. The reentrable moisture barrier of claim 1 wherein additional flexible sheets are deformed so as to be disposed between the cables and the inside surface of the second portion or the inside surface of the first portion, or the inside surfaces of both the first and second portions to prevent ground moisture from reaching and condensing on the inside surface of the first portion.

15. A method of preventing entry of ground moisture in an enclosure containing cables and or cable components, the enclosure having a first portion and a second portion, the first portion having an enclosed first end, an open second end, and an inside surface, the second portion being located at or near or below ground level with an open first end with a cross sectional area and matable with the second end of the first portion, a second end, and an inside surface, wherein cables and or cable components are connected within the enclosure, comprising the steps of:

removing the first portion from the second portion;
crumpling at least one flexible sheet;
stuffing the at least one flexible crumpled sheet between the inside surface of the second portion and the cables such that ground moisture cannot reach the first end of the first portion; and replacing the first portion on the second portion such that the cables and or cable components are environmentally isolated.

16. The method of claim 15 in which the step of inserting the at least one flexible sheet further comprises stuffing additional crumpled flexible sheets between the inside surface of the second portion and the cable such that ground moisture cannot reach the inside surface of the first portion.

17. The method of claim 15 in which the at least one flexible sheet is formed of non-porous and non-hydroscopic material.

18. The method of claim 15 in which the at least one flexible sheet has a surface area greater than the cross sectional area of the first open end of the second enclosure.

19. A method of installing additional cables and or cable components and protecting the additional cables and or cable components from ground moisture in an enclosure containing cables and or cable components having a first portion, a second portion, and a reentrable moisture barrier, the first portion having an enclosed first end, an open second end, and an inside surface, the second portion being located at or near or below ground level with an open first end with a cross sectional area and matable with the second end of the first portion, a second end, and an inside surface, wherein the cables and or cable components are connected within the enclosure, the reentrable moisture barrier having at least one flexible sheet having a greater cross sectional area than the cross sectional area of the open first end of the second portion, the at least one flexible sheet being crumpled so as to be stuffed between the cables and or cable components and the inside surface of the first and second portions to prevent moisture from condensing in the enclosed first end of the first portion, comprising the steps of:

removing the first portion from the second portion;
removing the at least one crumpled flexible sheet between the inside surface of the second portion and the cables and or cable components;
connecting the additional components to the cables and or cable components;
crumpling the at least one flexible sheet and stuffing the at least one crumpled flexible sheet between the inside surface of the second portion and the cable and or cable components and additional components such that ground moisture cannot reach the enclosed first end of the first portion; and
replacing the first portion on the second portion such that the cables and or cable components and the additional components are environmentally isolated.

20. An improved enclosure for connection of underground cables, the enclosure comprising in combination:

a) housing means including a lower portion mounted on the ground and into which the underground cables enter, and an upper portion mounted on the lower portion, the upper and lower portions together defining an enclosed volume within which cable connectors are connected to the underground cables; and b) a layer of material impervious to passage of moisture disposed within the housing means dividing the enclosed volume into upper and lower chambers such that the cable connectors are located within the upper chamber and isolated from moisture, the layer of material being a thin sheet of moisture impervious material having substantially no shape memory and being crumpled to conform to the cables and the housing means.

* * * * *